United States Patent
Jackson et al.

(10) Patent No.: US 12,446,551 B1
(45) Date of Patent: Oct. 21, 2025

(54) PET TOY

(71) Applicant: c/o Doskocil Manufacturing Company, Inc., Arlington, TX (US)

(72) Inventors: Jill Jackson, Arlington, TX (US); Jessica Juarez, Arlington, TX (US); Alexandra Hackett, Arlington, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 18/899,537

(22) Filed: Sep. 27, 2024

(51) Int. Cl.
*A01K 15/02* (2006.01)

(52) U.S. Cl.
CPC .................................. *A01K 15/025* (2013.01)

(58) Field of Classification Search
CPC ..... A01K 15/025; A01K 15/026; A01K 15/02
See application file for complete search history.

(56) References Cited

U.S. PATENT DOCUMENTS

| | | | | |
|---|---|---|---|---|
| 5,782,207 | A * | 7/1998 | Goodham | A01K 15/025 |
| | | | | 119/707 |
| 8,181,606 | B1 * | 5/2012 | Kirschbaum | A01K 15/025 |
| | | | | 119/707 |
| 8,944,011 | B2 * | 2/2015 | Kirschbaum | A01K 15/025 |
| | | | | 119/707 |
| 2007/0095302 | A1 * | 5/2007 | Levan | A01K 15/025 |
| | | | | 119/708 |
| 2014/0130748 | A1 * | 5/2014 | Curry | A01K 15/025 |
| | | | | 119/707 |
| 2014/0209037 | A1 * | 7/2014 | Kirschbaum | A01K 15/025 |
| | | | | 119/708 |
| 2015/0050861 | A1 * | 2/2015 | Lamprey, Jr. | A63H 5/00 |
| | | | | 119/707 |
| 2016/0165843 | A1 * | 6/2016 | Kirschbaum | A01K 15/027 |
| | | | | 119/708 |
| 2016/0165844 | A1 * | 6/2016 | Nunn | A01K 29/00 |
| | | | | 119/709 |
| 2019/0289823 | A1 * | 9/2019 | Renforth | B65H 75/4473 |
| 2020/0008397 | A1 * | 1/2020 | Willinger | A01K 15/025 |

* cited by examiner

*Primary Examiner* — Trinh T Nguyen
(74) *Attorney, Agent, or Firm* — Foley & Lardner LLP

(57) ABSTRACT

A pet toy includes a rod, a fastener and an outer casing. The rod includes a plurality of ridges along a longitudinal length of the rod between a first longitudinal end and a second longitudinal end of the rod. The fastener is disposed at the first longitudinal end of the rod for detachably attaching an interactive toy to the rod. The outer casing has an opening that receives the rod therethrough. The outer casing is slidable between the first and second longitudinal ends of the rod to create a noise as the ridges ratchet against the opening of the outer casing.

15 Claims, 3 Drawing Sheets

PET TOY

BACKGROUND

Technical Field

The present disclosure generally relates to a pet toy. More specifically, the present disclosure relates to a pet toy designed for interactive engagement with a pet.

Background Information

A pet toy can be elongated so to have a user handle at one end and a toy object attached to a cord, such as a string or chain, at another end. These types of pet toys are particularly suitable as cat toys. Moving the pet toy causes the toy object to move in a manner that will entice a cat to chase and catch the toy object. Pet toys can be retractable for easy storage and for convenient detachment of the toy object from the cord.

SUMMARY

In view of the state of the known technology, one aspect of the present disclosure is to provide a pet toy comprising a rod, a fastener and an outer casing. The rod includes a plurality of ridges along a longitudinal length of the rod between a first longitudinal end and a second longitudinal end of the rod. The fastener is disposed at the first longitudinal end of the rod for detachably attaching an interactive toy to the rod. The outer casing has an opening that receives the rod therethrough. The outer casing is slidable between the first and second longitudinal ends of the rod to create a noise as the ridges ratchet against the opening of the outer casing.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
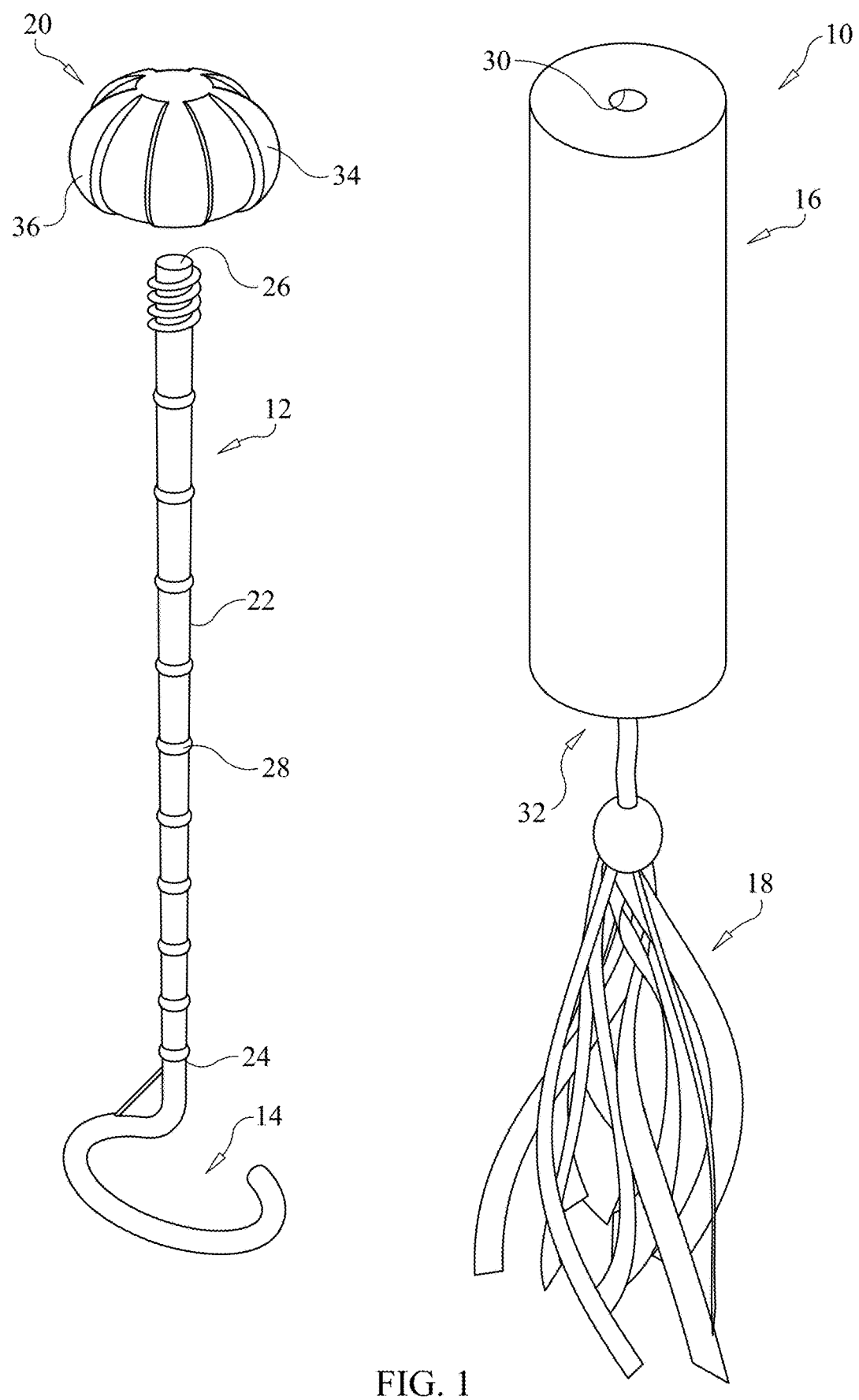
FIG. 1 is an exploded view of a pet toy in accordance with an illustrated embodiment.
Figure 2:
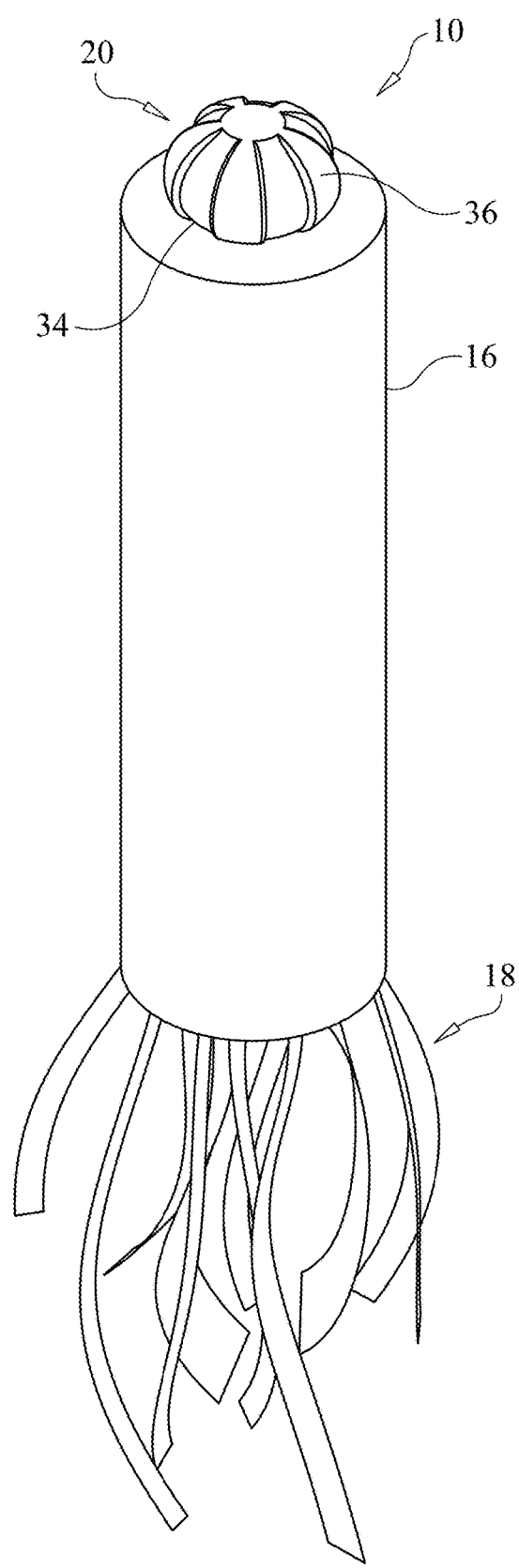
FIG. 2 is a top perspective view of the pet toy of FIG. 1 in an extended position.
Figure 3:
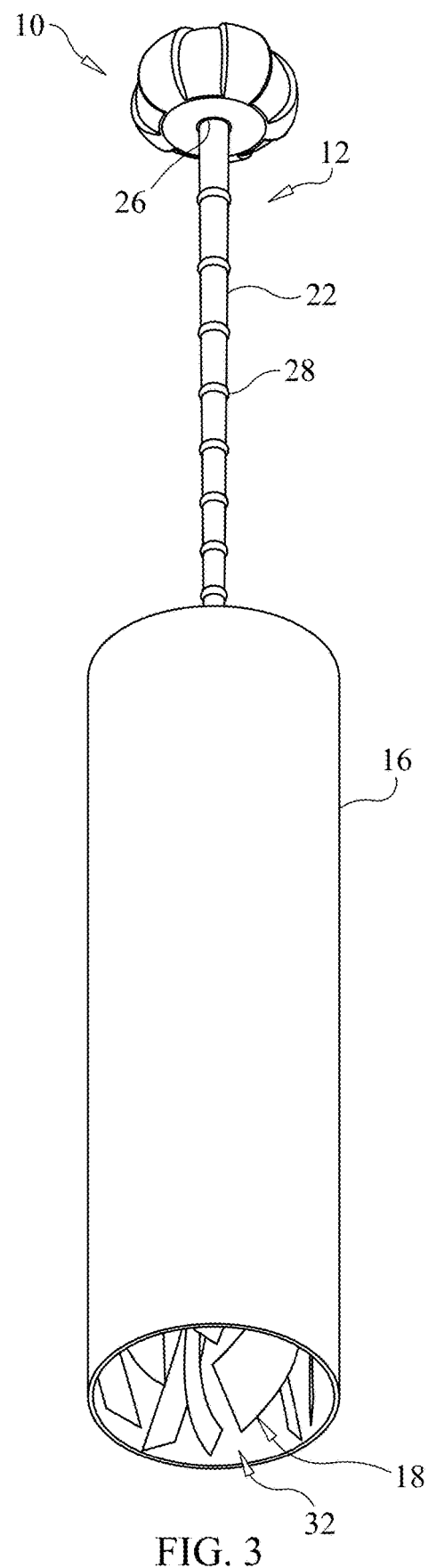
FIG. 3 is a bottom perspective view of pet toy of FIGS. 1 and 2 in a retracted position.

Referring initially to FIG. 1, a pet toy 10 is illustrated in accordance with an embodiment. The pet toy 10 comprises a rod 12, a fastener 14 and an outer casing 16. The pet toy 10 of the illustrated embodiment is considered a toy wand for engaging pets during play, such as a cat wand for engaging cats. Therefore, the pet toy 10 further comprises an interactive toy 18 provided at the fastener 14 for engaging a pet. The outer casing 16 slides along the rod 12 to retract and extend the interactive toy 18 from the outer casing 16 during play to sustain a pet's interest, as seen in FIGS. 2 and 3. The pet toy 10 further comprises a handle 20 provided at the rod 12 for user engagement.

The rod 12 includes an elongated main body 22 extending between a first longitudinal end 24 and a second longitudinal end 26 of the rod 12. The fastener 14 is disposed at the first longitudinal end 24 of the rod 12, and the handle 20 is disposed at the second longitudinal end 26 of the rod 12. The rod 12 is a thin, elongated member that is preferably made of plastic. The rod 12 is preferably made to be deformable or elastic in some way such that the rod 12 retains its original form after being bent or manipulated. Therefore, the rod 12 can alternatively be made of rubber or a mix of rubber and plastic such that the rod 12 is deformable during use.

As best seen in FIG. 1, the rod 12 includes a plurality of ridges 28 disposed on the main body 22. Therefore, the ridges 28 are disposed along a longitudinal length of the rod 12. The ridges 28 are defined by a series of abutments extending radially outward from the main body 22 in intervals along the longitudinal length. The rod 12 is deformable as the outer casing 16 slides along the longitudinal length of the rod 12. The casing is operated to slide along the rod 12 to cause the ridges 28 to ratchet along the outer casing 16.

Figure 4:
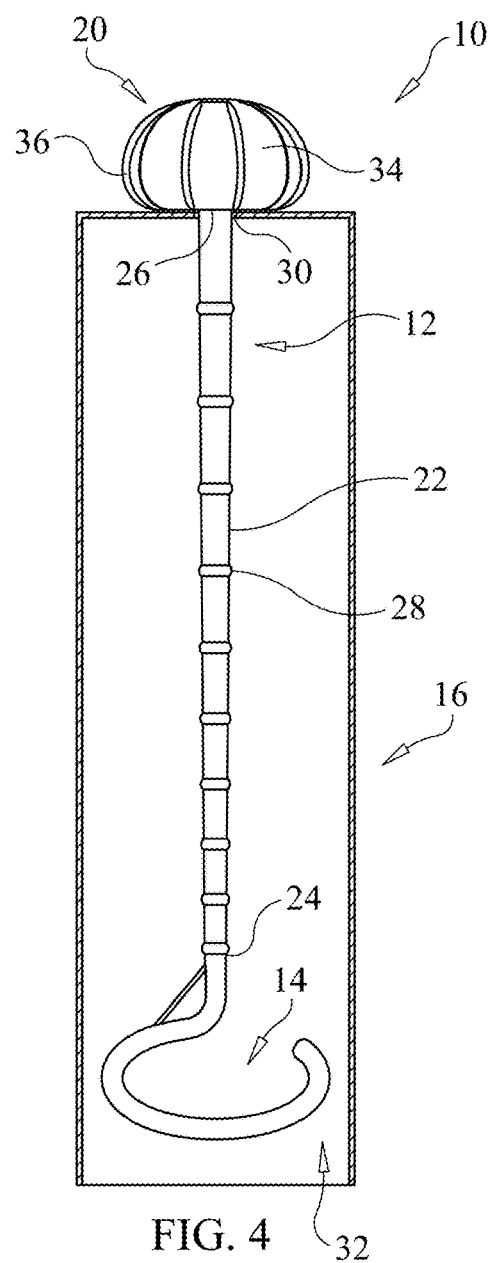
FIG. 4 is a cross-sectional view of the pet toy in the extended position.
Figure 5:
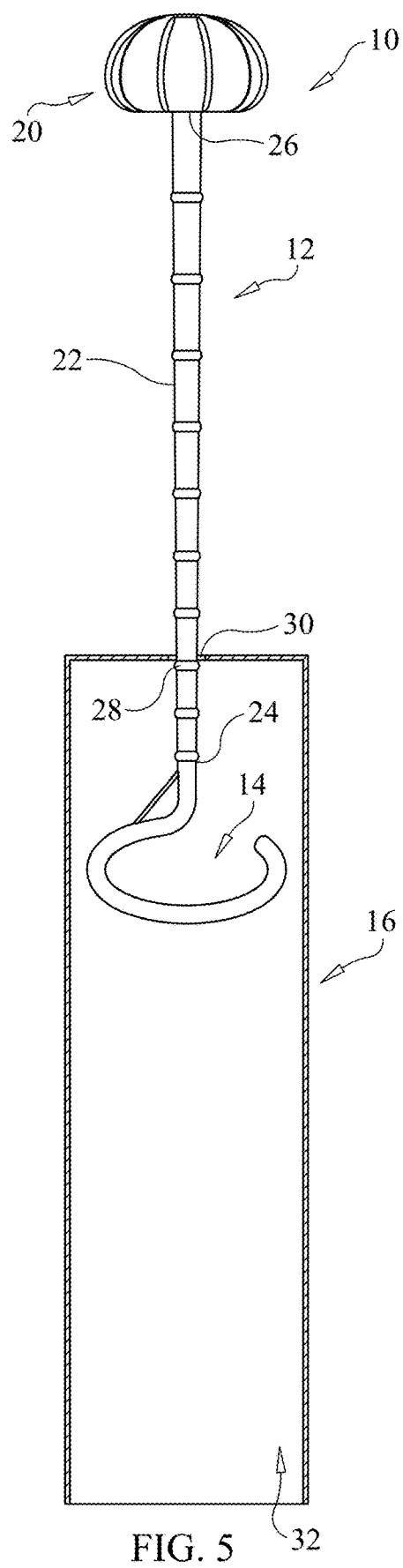
FIG. 5 is a cross-sectional view of the pet toy in the retracted position.

As shown in FIGS. 1, 4 and 5, the outer casing 16 has an opening 30 that receives the rod 12 therethrough. The opening 30 of the outer casing 16 has a maximum diameter that is smaller than a maximum diameter of the ridges 28 along the rod 12. The outer casing 16 is slidable between the first and second longitudinal ends 24 and 26 of the rod 12 to create a noise as the ridges 28 ratchet against the opening 30 of the outer casing 16. The outer casing 16 and the rod 12 preferably interact to create a crisp crackling or snap-like sound caused by the outer casing 16 sliding against the ridges 28. The sound is designed to engage a pet's interest.

The outer casing 16 includes a hollow interior 32 that receives the interactive toy 18 when the interactive toy 18 is retracted into the outer casing 16, as seen in FIGS. 3 to 5. The outer casing 16 is rigid and non-deformable. The outer casing 16 is preferably made of a thicker plastic than the rod 12. Alternatively, the outer casing 16 can be made of cardboard that is fortified with an outer plastic shell. While the outer casing 16 is illustrated as a cylinder in the illustrated embodiment, it will be apparent to those skilled in the pet products field from this disclosure that the outer casing 16 can be provided to have other types of shapes, such as a cone, a dome or a series of domes, etc.

The fastener 14 is disposed at the first longitudinal end 24 of the rod 12 for detachably attaching the interactive toy 18 to the rod 12. That is, the interactive toy 18 is fastened to the rod 12 via the fastener 14. As shown, the fastener 14 is an open hook for attaching the interactive toy 18 thereto. The open hook can receive a loop of the interactive toy 18. The fastener 14 can also be a snap hook that can open and close to receive and release the hook as necessary. That is, the fastener 14 is a hook and the interactive toy 18 is attached to the hook. The hook can also be releasably attached to the rod 12, such as being capped to the first longitudinal end 24 by interference fit. This way, the interactive toy 18 can be released from the rod 12 upon enough force from the pet.

The interactive toy 18 is provided to the rod 12 by the fastener 14. The interactive toy 18 extends from the outer casing 16 as the outer casing 16 slides towards the second longitudinal end 26, as seen in FIG. 2. As shown in FIG. 3, the interactive toy 18 retracts into the outer casing 16 as the outer casing 16 slides towards the first longitudinal end 24.

That is, the interactive toy 18 is extended or revealed from the outer casing 16 when the outer casing 16 slides upward towards the handle 20. The interactive toy 18 is then encased by the outer casing 16 as the outer casing 16 slides down the rod 12 from the handle 20 towards the interactive toy 18.

While the interactive toy 18 is illustrated as ribbons, it will be apparent to those skilled in the vehicle field that the interactive toy 18 can be any other types of toys as desired. For example, the interactive toy 18 can be provided as one or more butterflies, one or more fish, etc. The interactive toy 18 is made of fabric or a mixture of fabric and other textured materials such as feathers. Therefore, the interactive toy 18 can include plastic streamers or spongelike extensions for providing different types of textures for the pet's engagement.

The handle 20 is detachably provided to the second longitudinal end 26 of the rod 12. Preferably, the handle 20 includes internal threads that engages with threads of the first longitudinal end 24 of the rod 12. That is, the handle 20 is threadedly engaged with the rod 12. However, it will be apparent to those skilled in the pet products field from this disclosure that the handle 20 can be provided to the rod 12 as a cap by snap-fit or by interference fit. The handle 20 is provided as a circular object with a textured surface having ridges and indentations to facilitate user engagement. The handle 20 includes a user engagement surface for securing and removing the handle 20. The handle 20 is sized and dimensioned for easy fit into a user's palm and for easy gripping at the ridges and/or indentations along the user engagement surface 34 in order to operate the handle 20 such as by rotating to thread or unthread the handle 20 with respect to the rod 12. When the handle 20 is removed from the rod 12, the outer casing 16 can be also removed from the handle 20. Thus, the outer casing 16 is removable from the rod 12 when the handle 20 is removed from the rod 12 so that the pet can enjoy a playing with the rod 12 and the interactive toy 18 without the outer casing 16.

In the illustrated embodiment, the handle 20 is provided as a circular member with radially extending ridges provided in a circumferential direction on the handle 20. Therefore, the handle 20 includes an outer circumferential surface 36 that defines an outer perimeter of the handle 20. However, it will be apparent to those skilled in the pet products field from this disclosure that the handle 20 can come in different types of shapes and/or sizes as needed or desired, such as a cube or a star.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pet toy comprising:
   a rod including a plurality of ridges along a longitudinal length of the rod between a first longitudinal end and a second longitudinal end of the rod;
   a fastener disposed at the first longitudinal end of the rod for detachably attaching an interactive toy to the rod; and
   an outer casing having an opening that receives the rod therethrough, the outer casing slidable between the first and second longitudinal ends of the rod to create a noise as the ridges ratchet against the opening of the outer casing.

2. The pet toy according to claim 1, further comprising the interactive toy provided at the fastener, the interactive toy retracting into the outer casing as the outer casing slides towards the first longitudinal end, the interactive toy extending from the outer casing as the outer casing slides towards the second longitudinal end.

3. The pet toy according to claim 2, further comprising a handle detachably provided to the second longitudinal end of the rod.

4. The pet toy according to claim 3, wherein the handle includes an outer circumferential surface that defines an outer perimeter of the handle.

5. The pet toy according to claim 4, wherein the handle includes internal threads that engages with threads of the first longitudinal end of the rod.

6. The pet toy according to claim 2, wherein the rod is made of elastic plastic such that the rod is deformable as the outer casing slides along the longitudinal length of the rod.

7. The pet toy according to claim 6, wherein the outer casing is rigid and non-deformable.

8. The pet toy according to claim 7, wherein the outer casing includes a hollow interior that receives the interactive toy when the interactive toy is retracted into the outer casing.

9. The pet toy according to claim 2, wherein the opening of the outer casing has a maximum diameter that is smaller than a maximum diameter of the ridges along the rod.

10. The pet toy according to claim 9, wherein
the rod is made of elastic plastic such that the rod is deformable when the casing is operated to slide along the rod to cause the ridges to ratchet along the outer casing.

11. The pet toy according to claim 10, further comprising
a handle detachably provided to the second longitudinal end of the rod.

12. The pet toy according to claim 11, wherein
the handle includes an outer circumferential surface that defines an outer perimeter of the handle.

13. The pet toy according to claim 12, wherein
the handle includes internal threads that engages with threads of the first longitudinal end of the rod.

14. The pet toy according to claim 13, wherein
the outer casing is removable from the rod when the handle is removed from the rod.

15. The pet toy according to claim 14, wherein
the fastener is a hook and the interactive toy is attached to the hook.

* * * * *